United States Patent
Dring et al.

(10) Patent No.: US 9,517,540 B1
(45) Date of Patent: Dec. 13, 2016

(54) MILLING MACHINE WITH A SMART CLAMP FOR AUTOMATICALLY DETERMINING THE Z ORIGIN OF A WORK PIECE

(71) Applicant: Inventables, Inc., Chicago, IL (US)

(72) Inventors: Barton J. Dring, Chicago, IL (US); Zachary M. Kaplan, Chicago, IL (US)

(73) Assignee: Inventables, Inc., Chicago, IL (US)

( * ) Notice: Subject to any disclaimer, the term of this patent is extended or adjusted under 35 U.S.C. 154(b) by 0 days.

(21) Appl. No.: 14/871,326

(22) Filed: Sep. 30, 2015

(51) Int. Cl.
| | |
|---|---|
| *B23Q 5/20* | (2006.01) |
| *G05B 19/19* | (2006.01) |
| *B23Q 17/00* | (2006.01) |
| *B23Q 17/22* | (2006.01) |
| *B23Q 11/00* | (2006.01) |
| *G05B 19/18* | (2006.01) |
| *B23Q 15/22* | (2006.01) |

(52) U.S. Cl.
CPC ............. *B23Q 5/20* (2013.01); *B23Q 11/0092* (2013.01); *B23Q 15/22* (2013.01); *B23Q 17/003* (2013.01); *B23Q 17/22* (2013.01); *G05B 19/182* (2013.01); *G05B 19/19* (2013.01); *G05B 2219/45145* (2013.01); *G05B 2219/49134* (2013.01)

(58) Field of Classification Search
CPC ....... B23Q 5/20; B23Q 11/0092; B23Q 15/22; G05B 19/182; G05B 19/41825; G05B 2219/49134
See application file for complete search history.

(56) References Cited

U.S. PATENT DOCUMENTS

| | | | |
|---|---|---|---|
| 3,266,502 | A | 8/1966 | Copland |
| 3,524,063 | A | 8/1970 | Mangan |
| 4,009,376 | A | 2/1977 | Faraguet |
| 4,088,886 | A | 5/1978 | Moulton |
| 4,428,055 | A | 1/1984 | Kelley et al. |
| 4,443,929 | A | 4/1984 | Bayer et al. |
| 4,631,834 | A * | 12/1986 | Hayashi ................ G01B 5/008 33/1 M |

(Continued)

FOREIGN PATENT DOCUMENTS

| | | |
|---|---|---|
| CN | 201253780 Y | 6/2009 |
| JP | 08316613 A * | 11/1996 |

OTHER PUBLICATIONS

"Automatic Z Adjustment Unit", printed from the Internet at http://vhf.de/en/cnc-milling-machines/measuring-devices/automatic-z-adjustment-unit.html dated Mar. 12, 2015, 2 pages.

(Continued)

*Primary Examiner* — Crystal J Barnes-Bullock
(74) *Attorney, Agent, or Firm* — Brinks Gilson & Lione (57) ABSTRACT

A milling machine and method for automatically determining the Z origin are provided. In one embodiment, a milling machine comprises a support surface; a clamp comprising a first clamp portion and a second clamp portion to accept and secure a work piece, wherein the second clamp portion comprises a sensor; a spindle movable in a Z direction; and a controller. The controller is configured to automatically determine a position of a top of the work piece by having the spindle be positioned over the sensor and then moving the spindle in the Z direction until the controller receives a signal from the sensor indicating that a tool held by the spindle contacted the sensor. Other embodiments are provided.

20 Claims, 13 Drawing Sheets

(56) References Cited

U.S. PATENT DOCUMENTS

| | | | |
|---|---|---|---|
| 4,706,373 A * | 11/1987 | Andriussi | B23B 39/205 408/35 |
| D309,146 S | 7/1990 | Nemetz | |
| 4,944,643 A | 7/1990 | Lehmkuhl | |
| 5,025,539 A | 6/1991 | Stark | |
| D319,834 S | 9/1991 | Rutschle | |
| 5,107,730 A * | 4/1992 | Muraki | B23Q 5/20 82/1.11 |
| D328,467 S | 8/1992 | Maleschew | |
| D336,749 S | 6/1993 | Lenard | |
| D338,212 S | 8/1993 | Corsi | |
| 5,246,316 A | 9/1993 | Smith | |
| 5,309,646 A | 5/1994 | Randolph, Jr. et al. | |
| 5,438,755 A | 8/1995 | Giberson | |
| 5,733,079 A | 3/1998 | Jessee et al. | |
| D401,248 S | 11/1998 | Schrepfer | |
| 5,844,191 A | 12/1998 | Cox | |
| 6,220,080 B1 | 4/2001 | Fauqué | |
| 6,480,757 B1 | 11/2002 | Susnjara | |
| D495,723 S | 9/2004 | Kawamura et al. | |
| 6,865,442 B1 | 3/2005 | Jared | |
| 7,133,803 B2 | 11/2006 | Kappel | |
| D549,747 S | 8/2007 | Nakano | |
| D612,873 S | 3/2010 | Spinelli | |
| 7,724,942 B2 | 5/2010 | Bryll | |
| 7,728,961 B2 | 6/2010 | Watson | |
| 8,680,745 B2 | 3/2014 | Matthews et al. | |
| D706,320 S | 6/2014 | Hynek et al. | |
| D722,468 S | 2/2015 | Yamamoto | |
| 8,977,382 B2 | 3/2015 | Sona | |
| D734,788 S | 7/2015 | Reches et al. | |
| 9,073,162 B2 * | 7/2015 | Magnuson | B23Q 15/22 |
| D759,736 S | 6/2016 | Huang | |
| D759,738 S | 6/2016 | Schonherr et al. | |
| D765,155 S | 8/2016 | Rickenbach | |
| 2001/0041651 A1 * | 11/2001 | Abe | B23Q 1/0009 483/3 |
| 2006/0035776 A1 | 2/2006 | Duncan et al. | |
| 2006/0073771 A1 * | 4/2006 | mandler | B24B 13/0057 451/42 |
| 2014/0157610 A1 | 6/2014 | Garvey et al. | |
| 2015/0056037 A1 * | 2/2015 | Wilson | B23D 5/02 409/289 |

OTHER PUBLICATIONS

"Canvey: The 3D carving machine for the maker in all of us," https://www.kickstarter.com/projects/carvey/carvey-the-3d-carving-machine-for-the-maker-in-all, Oct. 21, 2014-Sep. 18, 2015, 14 pages.

"Carvey: The 3D carving machine for the maker in all of us," https://www.kickstarter.com/projects/carvey/carvey-the-3d-carving-machine-for-the-maker-in-all/posts/1025511, Oct. 21, 2014, 5 pages.

Notice of Allowance in U.S. Appl. No. 29/541,137, dated Oct. 12, 2016, 9 pages.

* cited by examiner

MILLING MACHINE WITH A SMART CLAMP FOR AUTOMATICALLY DETERMINING THE Z ORIGIN OF A WORK PIECE

BACKGROUND

A computer numerical control (CNC) milling machine uses a cutting tool rotated by a spindle to remove material from the surface of a work piece as the work piece is moved with respect to the cutting tool. The work piece is placed on a support surface of the milling machine, and the milling machine needs to know the position of the work piece on the support surface (the X and Y origins), as well as the position of the top of the work piece (the Z origin), in order to calibrate the machine with the "zero" of the work piece. This calibration is done because the milling machine is typically programmed with instructions to move the cutting tool and/or work piece with respect to the X, Y, and Z zero coordinates of the work piece, and determining the X, Y, and Z origins are important to make sure a design is cut into the work piece at the proper location. In some milling machines, a user manually enters the X, Y, and Z origins into a computer connected to the milling machine. The X and Y origins can be determined by the user measuring the distance between the edges of the support surface and the location of a corner of the work piece. The Z origin can be determined by the user measuring the thickness of the work piece. After the calibration is complete, the milling machine carves a design into the work piece.

DETAILED DESCRIPTION

FIGS. 1-7 are perspective, front, top view, right-side, left-side, back, and bottom views, respectively, of a computer numerical control (CNC) milling machine (sometimes referred to herein as a "carving machine") 10 of an embodiment. It should be noted that this machine 10 is just one embodiment, and any suitable machine can be used and that the milling machine does not necessarily need to be computer numerical controlled. Also, the details discussed below should not be read into the claims, unless explicitly recited therein.

Figure 1:
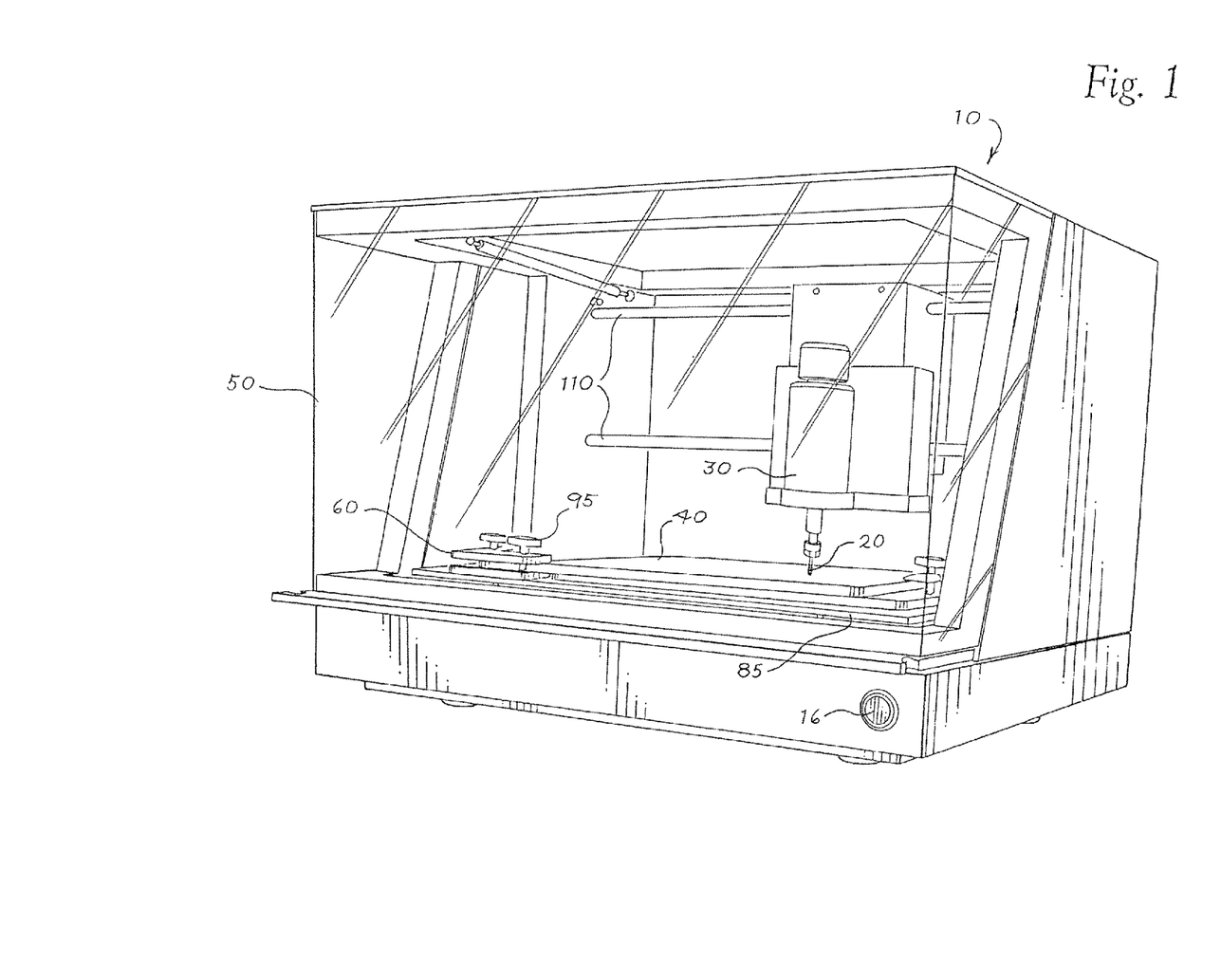
FIG. 1 is a perspective view of a computer numerical control (CNC) milling machine of an embodiment.
Figure 2:
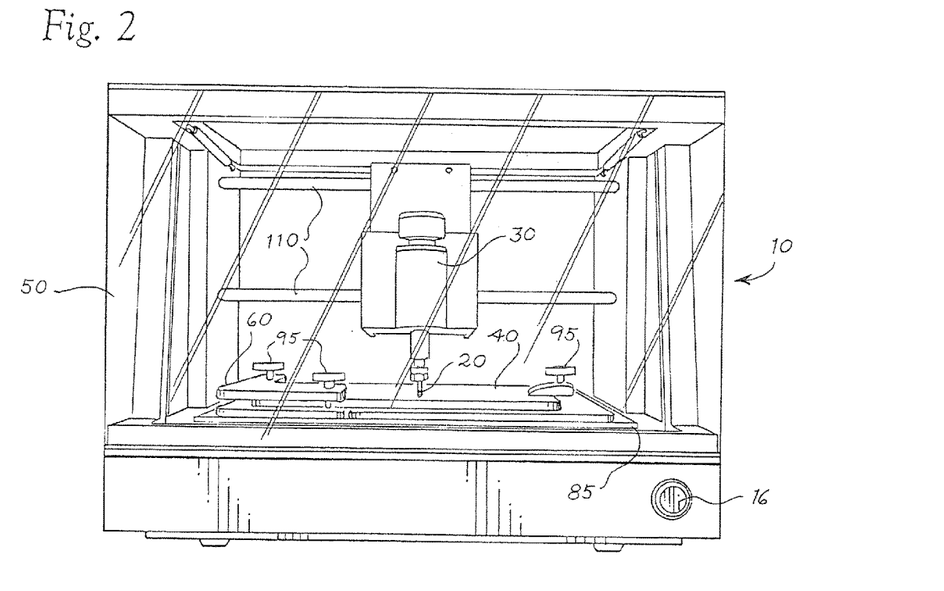
FIG. 2 is a front view of the CNC milling machine of FIG. 1.
Figure 3:
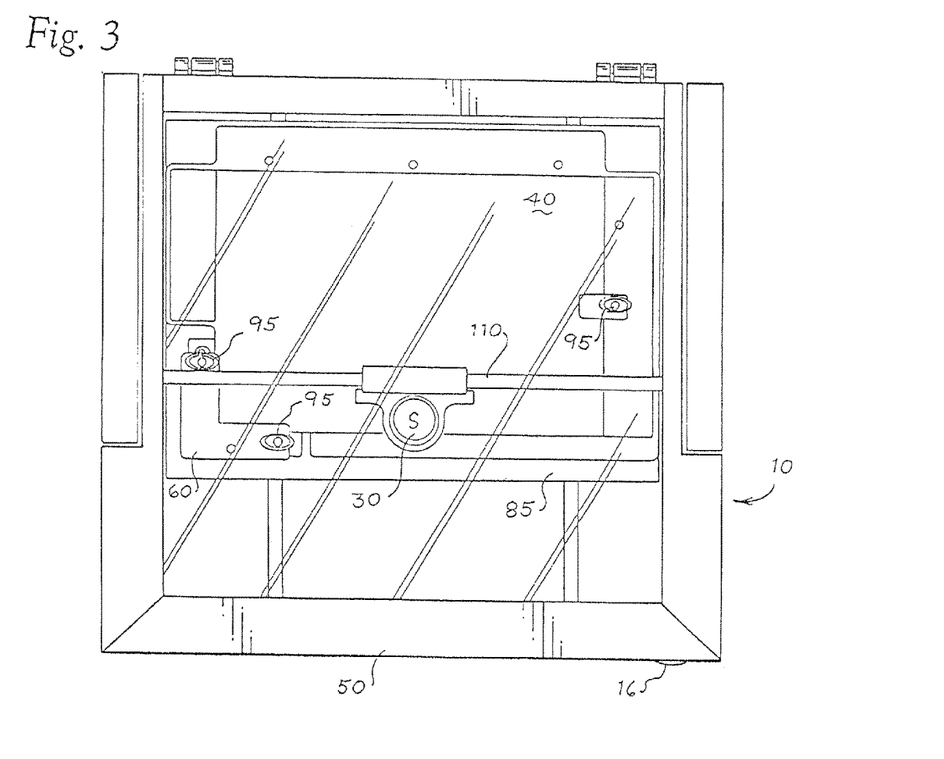
FIG. 3 is a top view of the CNC milling machine of FIG. 1.
Figure 4:
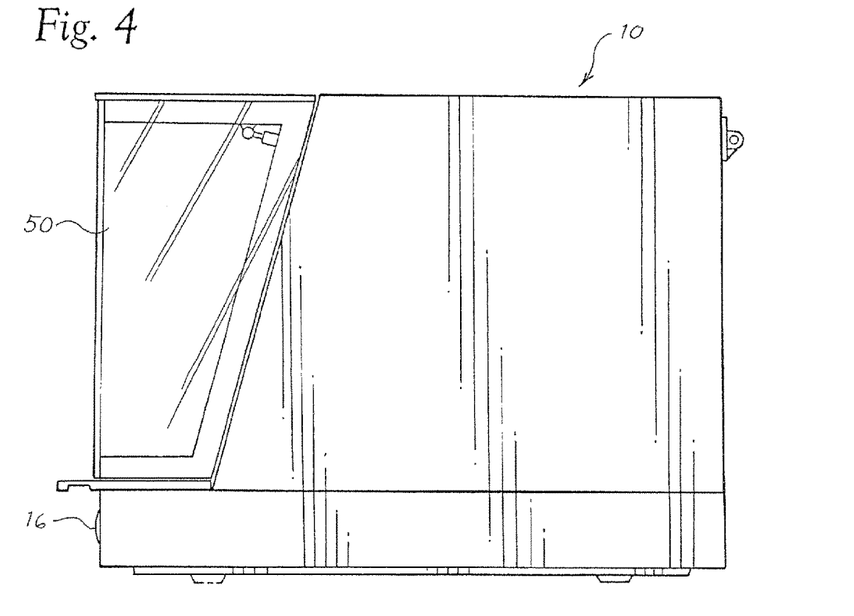
FIG. 4 is a right-side view of the CNC milling machine of FIG. 1.
Figure 5:
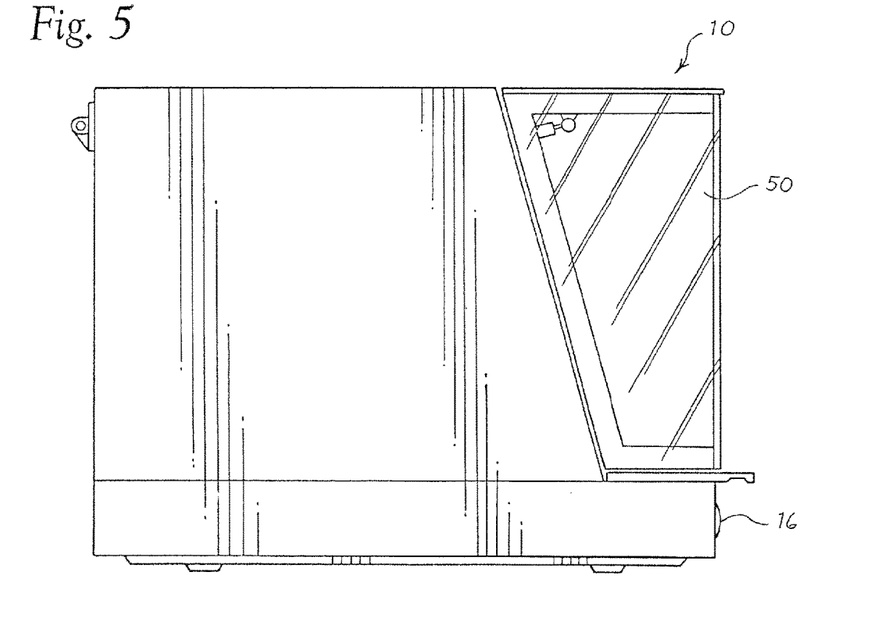
FIG. 5 is a left-side view of the CNC milling machine of FIG. 1.
Figure 6:
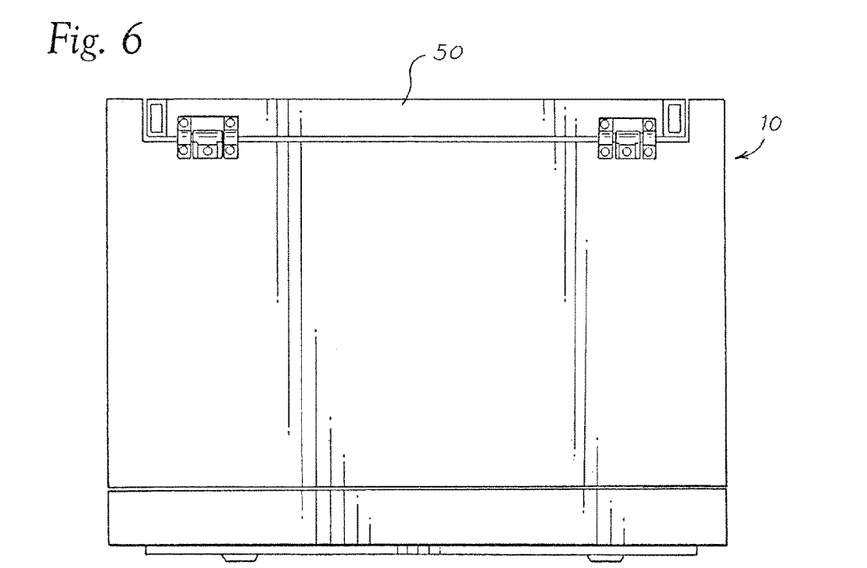
FIG. 6 is a back view of the CNC milling machine of FIG. 1.
Figure 7:
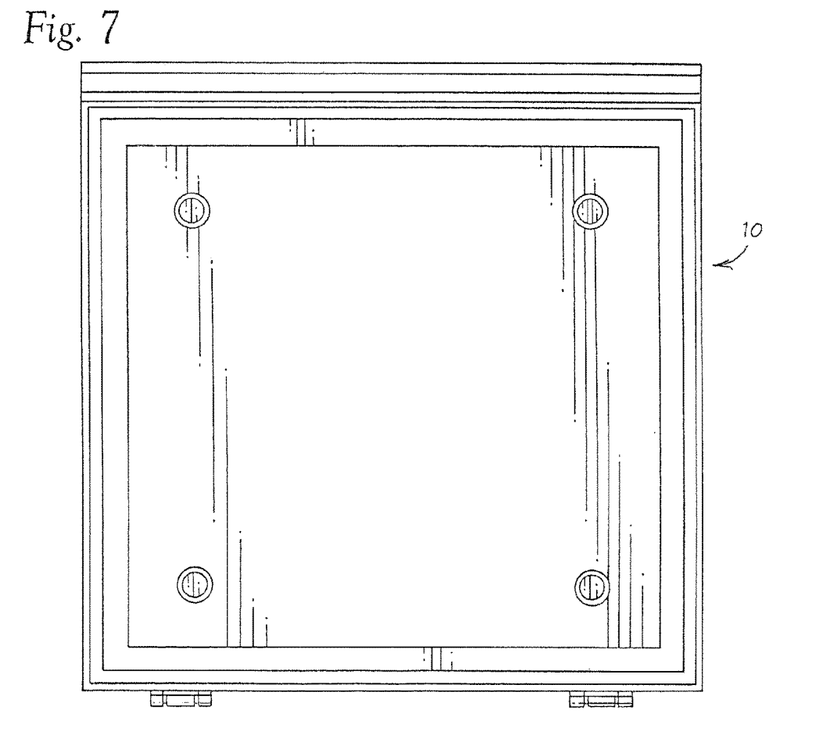
FIG. 7 is a bottom view of the CNC milling machine of FIG. 1.

In general, the milling machine 10 is a machine that uses a tool 20 (e.g., a rotary cutter) rotated by a spindle 30 to remove material from the surface of a work piece 40 as the work piece 40 is moved with respect to the cutting tool 20 (e.g., as the work piece is moved perpendicular to the axis of the cutting tool 20). In this way, the cutting tool 20 carves away a portion of the top surface of the work piece 40, with the cutting edges of the tool 20 repeatedly cutting into and exiting from the top surface of the work piece 40, shaving off chips of the work piece 40 with each pass. In this embodiment, the cutting area of the machine 10 is fully enclosed with a movable, see-through cover 50, which contains the dust generated during the machine operation and reduces the noise generated by the machine 10. In one embodiment, a light source (e.g., LED light(s)) (not shown) is included inside the case of the machine 10, so the user can view the progress of the carving operation.

The milling machine 10 can be programmed with a set of instructions (e.g., sent from an external computer) to move the spindle 30 vertically along the Z-axis and to move the spindle 30 and/or support surface 85 in the X and/or Y axes in order to carve a desired design into a work piece 40. In operation, a user can use design software running on a computer (e.g., a desktop computer, a laptop computer, a tablet, a phone, etc.) to create a design to be carved into a work piece 40. In one embodiment, Easel® is used as the design software, although other design software programs can be used (e.g., CAD or CAM programs, machine control software, a G-code sender that exports G-code, etc.). The user can create a design from scratch, import an existing design that the user made, or choose a design from a library of samples or of designs that other users have created and shared. The user can also input the type of material that will be used for the work piece 40 (e.g., wood, cork, plastic, metal, linoleum, foam, molding wax, circuitry boards, etc.). The design software can be pre-programmed with the technical details of a variety of materials, so the user can just select the type of material he will be using, and the design software can make any adjustments based on the selected type of material (e.g., bit size and feed rate).

Figure 15:
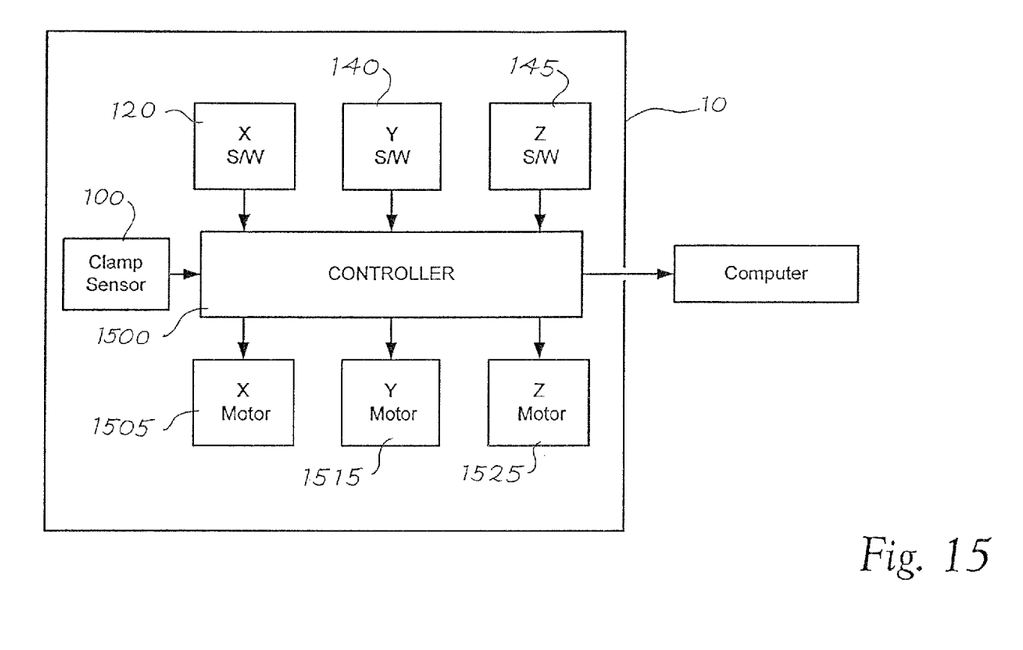
FIG. 15 is a block diagram of a controller of a CNC milling machine of an embodiment.

The software then transforms the created design into a set of instructions that a controller 1500 (see FIG. 15) in the milling machine 10 can use to carve the design into a work piece 40. The set of instructions can be communicated from the computer in communication with the milling machine 10 in any suitable way (e.g., by connecting the computer to a USB or other communication port on the machine, by wireless transmitting the design from the computer to the machine, etc.). (As used herein, the phrase "in communication with" could mean directly in communication with or indirectly in communication with through one or more components, which may or may not be shown or described herein.) In one embodiment, the carving process can be initiated by the user interacting with the computer (e.g., by clicking a displayed "start" button or icon) or with the machine 10 (e.g., by pushing a power button 16 on the machine). Also, it should be understood that while two devices (the machine 10 and the computer) were used in this example, a one-device system can be used (e.g., with the machine having a display device and a user interface, such as a mouse, keyboard, and/or touch screen) or a more-than-two-device system can be used (e.g., with the designing taking place at one computer and another computer being responsible for controlling the carving machine).

In one embodiment, the machine 10 weights 70 lbs (32 kg) and has a width of 21.7 inches (55 cm), a height of 16.6 inches (42 cm), and a depth of 20.5 inches (52 cm), with a work area having the following dimensions: width (X-axis) of 12 inches (30 cm), depth (Y-axis) of 8 inches (20 cm), and height (Z-axis) of 2.75 inches (7 cm). As such, the machine 10 is very suitable for use as a tabletop 3D carving machine. In one embodiment, the machine 10 runs on 100-240 (+/− 10%) volts of AC with 50/60 Hz using a universal power socket. In one embodiment, the spindle 30 is a 300 W DC spindle that spins at 3,000-12,000 RPM and has an ER-11 precision collet for bits with a ⅛" shank. The collet can be swapped out to accommodate bits with 3/16" or ¼" shanks (in one embodiment, a color-coded bit system is used to help the user identify which bits to use, which can simplify multi-cut jobs). In one embodiment, accuracy is 0.001" to 0.003", the spindle runout is 0.001", and the motor resolution is 0.001" or greater on all axes. Of course, these sample specifications are just examples, and other specifications can be used.

As discussed above, when a work piece is placed on a support surface of a milling machine, the milling machine needs to know the position of the work piece on the support surface (the X and Y origins), as well as the position of the top of the work piece (the Z origin), in order to calibrate the machine with the "zero" of the work piece. This calibration is done because the milling machine is typically programmed with instructions to move the cutting tool and/or work piece with respect to the X, Y, and Z zero coordinates of the work piece, and determining the X, Y, and Z origins are important to making sure a design is cut into the work piece at the proper location. In some milling machines, the X, Y, and Z origins are manually entered into a computer connected to the milling machine. The X and Y origins can be determined by a user measuring the distance between the edges of the support surface and the location of a corner of the work piece. The Z origin can be determined by a user measuring the thickness of the work piece.

Manually measuring and entering the X, Y, and Z origin coordinates into the computer can be difficult or inconvenient for some users, especially non-technical users who are using the milling machine as a tabletop carving machine in their home or small business. The milling machine 10 of this embodiment eliminates the need for manual measurement and data entry by using a "smart clamp" 60 to fix the X and Y origin coordinates of the work piece 40 and to automatically determine the Z origin coordinate.

As shown, inter alia, in FIGS. 1, 2, 8, 9, 12, and 13, the clamp 60 comprises first and second 70, 80 clamp portions, with the first clamp portion 70 fixed with respect to a support surface 85 and the second clamp portion 80 movable with respect to the support surface 85 to accept and secure the work piece 40 (e.g., with thumbscrews 95). It should be noted that "fixed" can, but does not necessarily mean, unremovable in all conditions. Also, the first clamp portion 70 can be fixed directly to the support surface 85 or indirectly to the support surface 85 through one or more intervening components.

A waste board 90 sits between the support surface 85 and the work piece 40 to prevent damage to the support surface 85 and/or tool 20 if the tool 20 were to pass through the work piece 40. In this embodiment, the second clamp portion 80 comprises a sensor 100. The sensor 100 can take any suitable form. For example, the sensor 100 can be a movable button, a movable or non-movable electrically-conductive element, a light boundary that senses when an object passes through it, etc. Also, although the sensor 100 is shown protruding from the second clamp portion 80 in this embodiment, in other embodiments, the sensor 100 is flush with or below the surface of the second clamp portion 80. In this embodiment, when contact is made with the sensor 100, the sensor 100 sends a signal to the controller 1500 of the milling machine 10 (see FIG. 15) via a wired or wireless connection.

Figure 8:
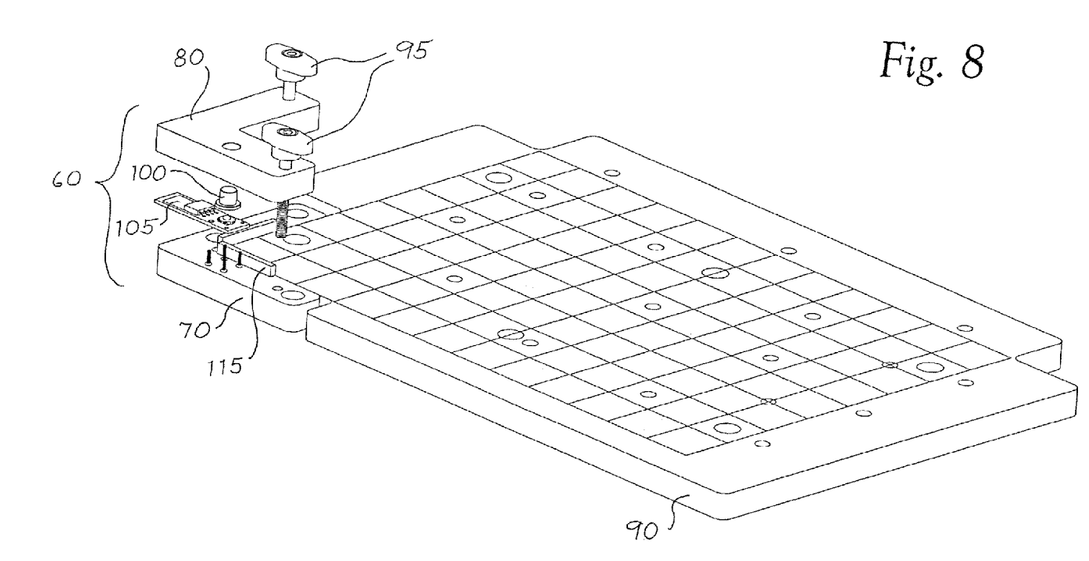
FIG. 8 is an exploded view of a smart clamp of an embodiment.
Figure 9:
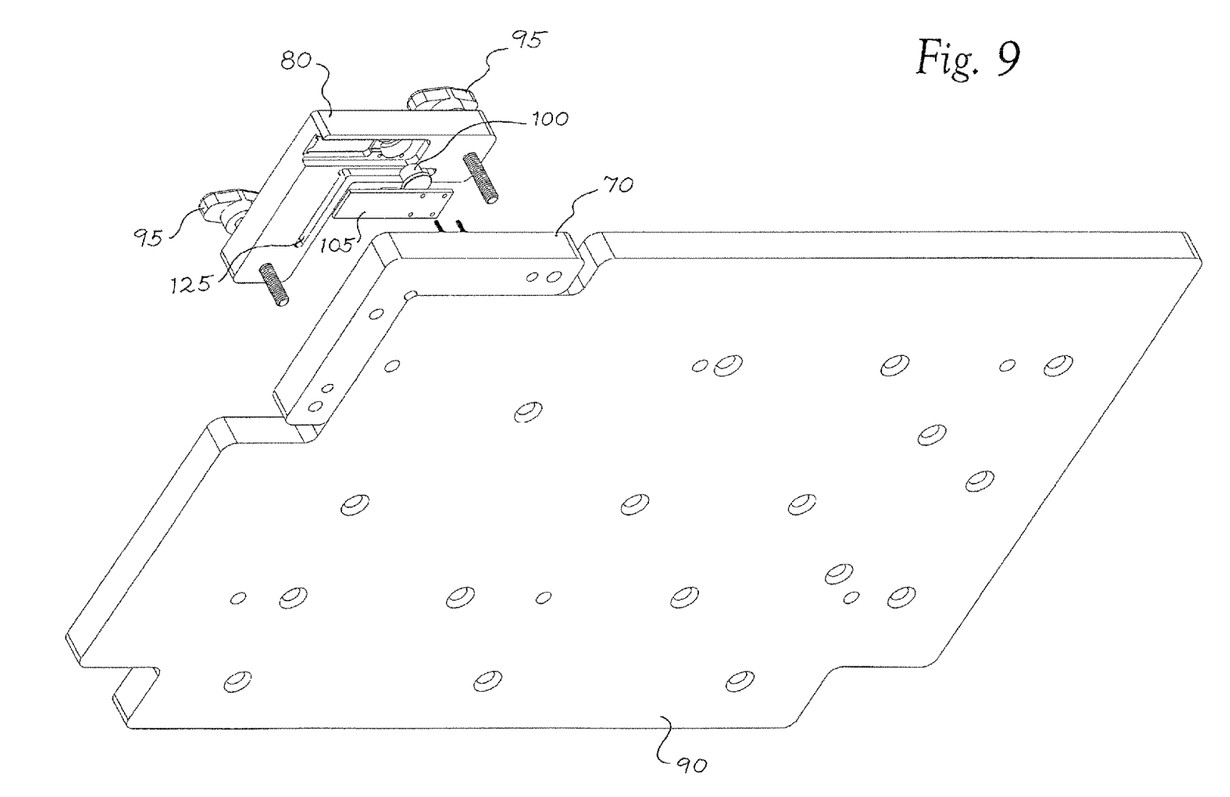
FIG. 9 is another exploded view of a smart clamp of an embodiment.

FIGS. 8 and 9 are exploded views of the smart clamp 60 in this embodiment. As shown in these figures, in this embodiment, the sensor 100 is connected to a circuit board 105 that leads to the controller 1500 via a wire or other electrical connector (not shown). The circuit board 105 can be secured to the second clamp portion 80 using one or more screws. The first clamp portion 70 has a raised portion (e.g., a ridge) 115 (see FIG. 8), which fits into a corresponding groove 125 in the second clamp portion 80 (see FIG. 9). (The second clamp portion 80 also comprises a recess to accept the circuit board 105 and sensor 100.) The raised portion 115 acts as a corner stop that registers the work piece 40 in the position of the known X and Y origins.

Figure 10:
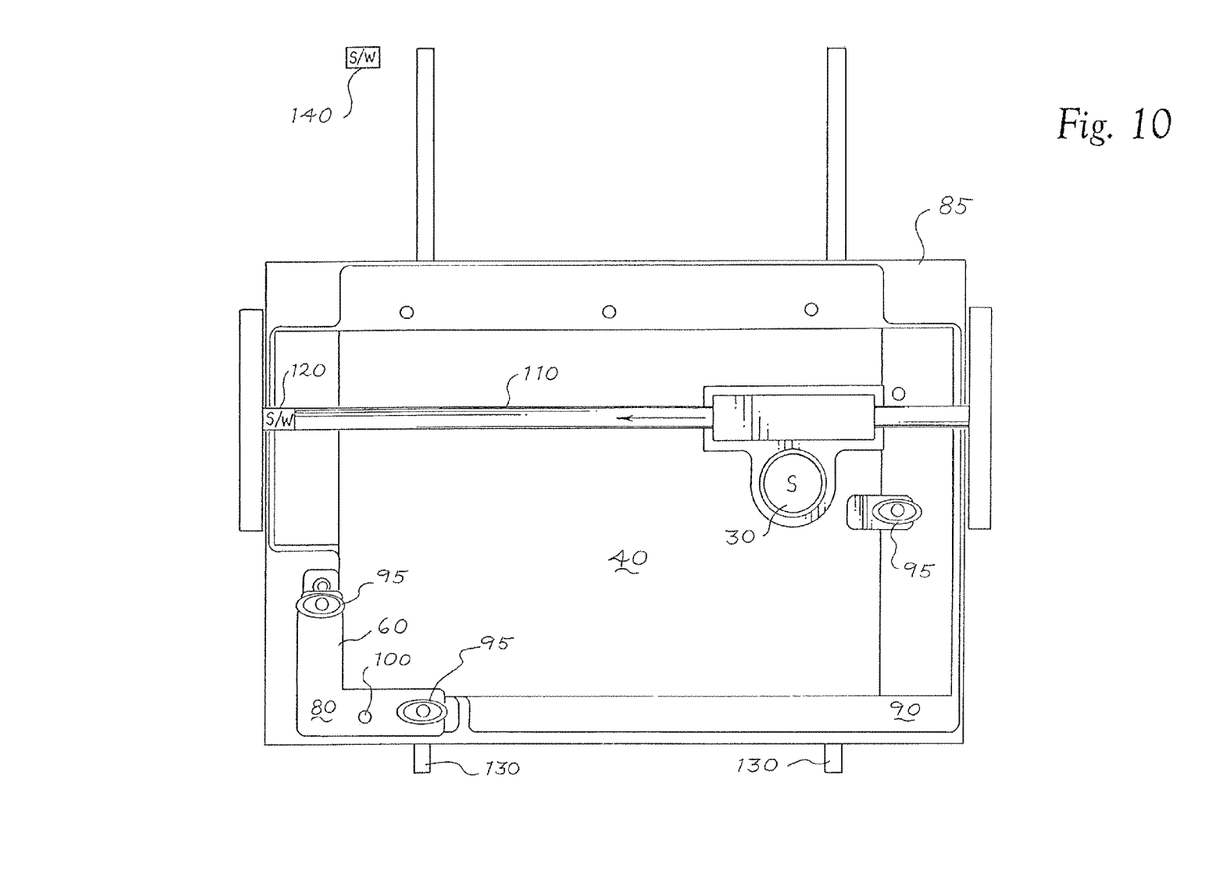
FIG. 10 is an illustration of a CNC milling machine of an embodiment with the spindle in a first position.
Figure 11:
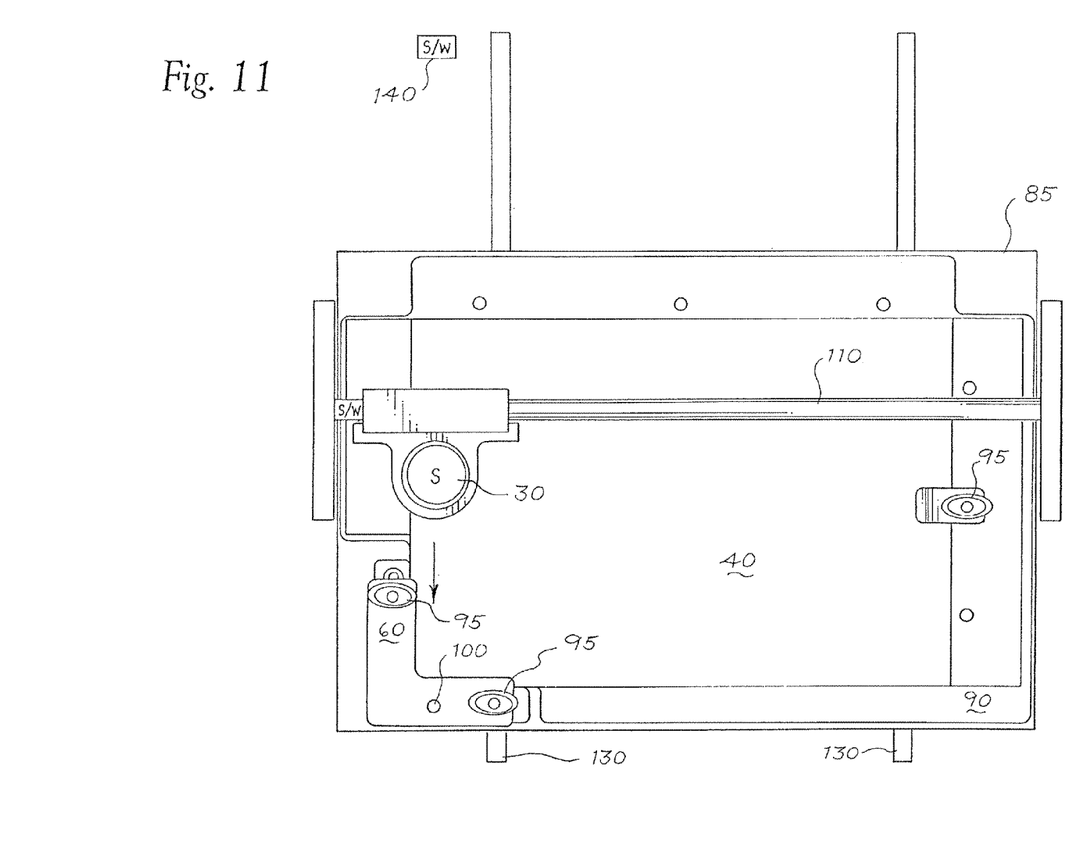
FIG. 11 is an illustration of a CNC milling machine of an embodiment with the spindle at an X origin position.

As shown in FIG. 10, because the first clamp portion 70 is fixed with respect to the support surface 85, the clamp 60 secures the work piece 40 in a fixed X-Y location on the support surface 85. This fixed X-Y location is programmed into the milling machine 10 (and/or computer) as the X and Y origins). So, when the user secures the clamp 60 onto the work piece 40, the lower left-hand corner of the work piece 40 is positioned at the X and Y origin point of the system. As such, the user does not need to measure the X and Y position of the work piece 40 and enter that data into the system. The sensor 100 in the clamp 60 is used to automatically determining the Z origin coordinate, as discussed below and in conjunction with the flow chart 1600 of FIG. 16 (the flow chart 1600 is an example of an algorithm that the controller 1500 can execute to automatically determine the Z origin).

Figure 12:
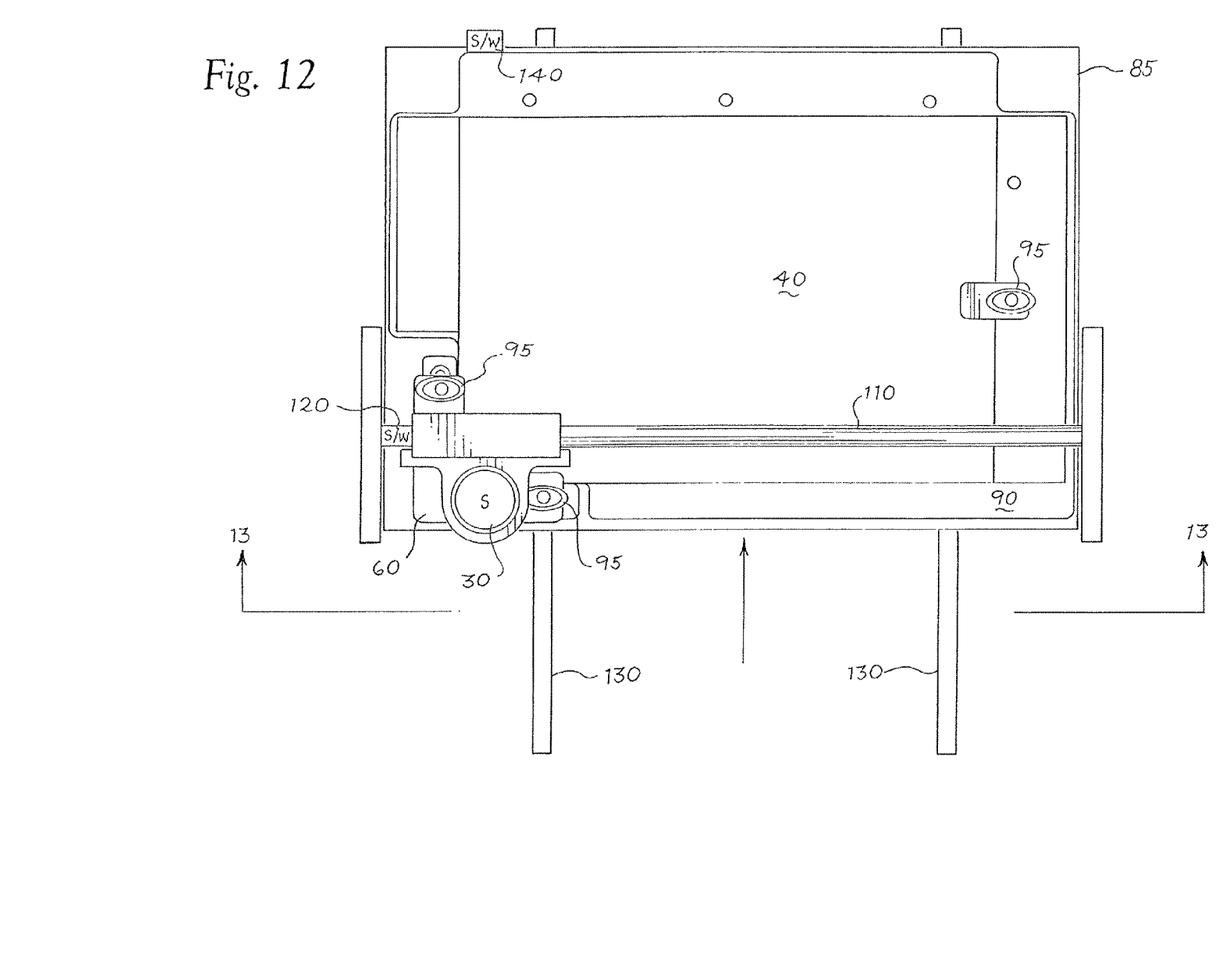
FIG. 12 is an illustration of a CNC milling machine of an embodiment with the spindle at a Y origin position.
Figure 13:
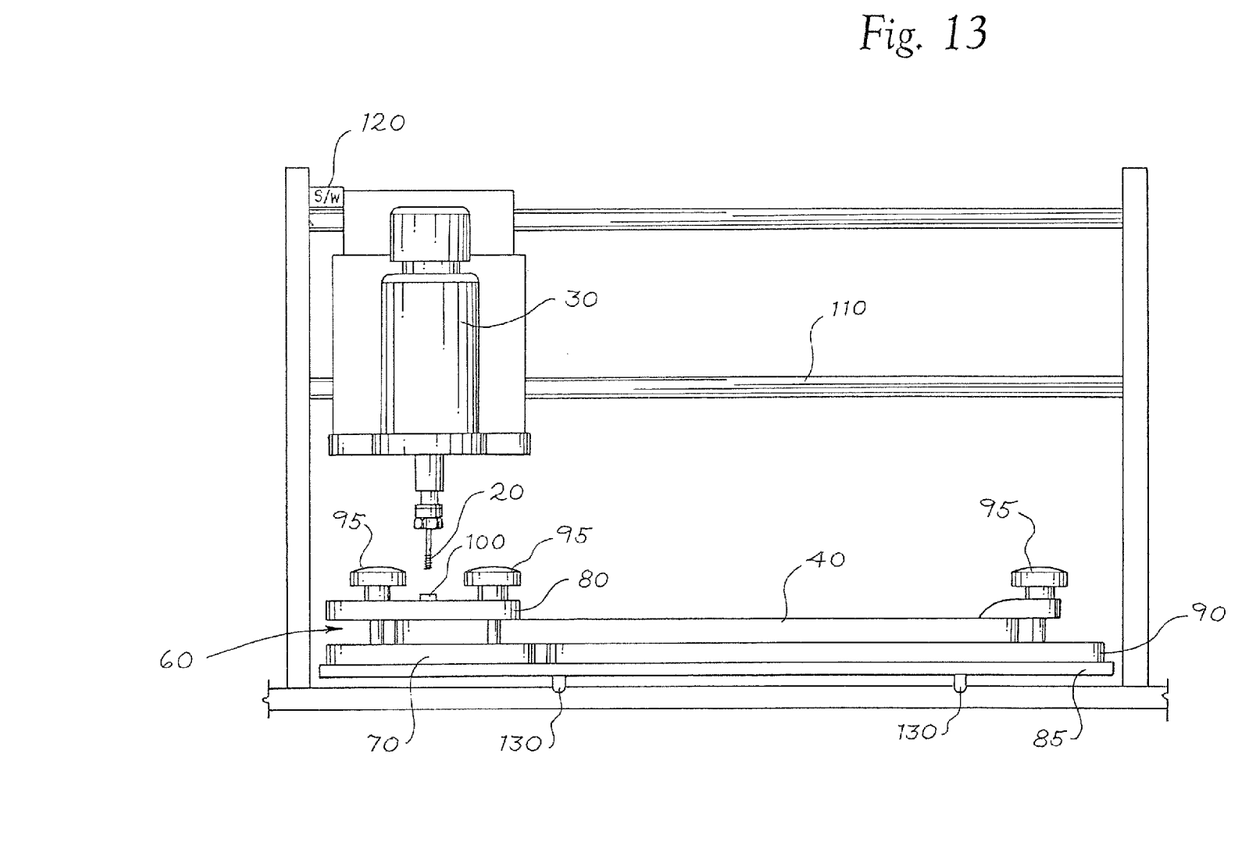
FIG. 13 is cross-sectional view of the CNC milling machine of FIG. 12 taken along the 13-13 line in FIG. 12.

First, as shown in FIGS. 10, 11, 15, and 16, the controller 1500 notes the position of the spindle 30 in the Z direction or activates the Z motor 1535 to move the spindle 30 in the Z direction to a known position (e.g., raising the spindle 30 until it reaches a switch (the "Z direction switch" or "Z switch") 145 or some other stop in a known location in the Z direction (act 1610). Moving the spindle 30 to a high (e.g., maximum) Z position allows the spindle 30 to move safely in the X and Y directions. Next, the controller 1500 activates the X motor 1505 (attached to the spindle housing) to move the spindle 30 in the X direction along horizontal rods 110 until the spindle 30 contacts a switch 120 (the "X direction switch" or "X switch") (act 620). Then (or before), the controller 1500 activates the Y motor 1515 (in this embodiment, under the support surface 85) to move the support surface 85 in the Y direction along vertical rods 130 until the support surface 85 contacts a switch 140 (the "Y direction switch" or "Y switch") (act 630). As shown in FIGS. 12 and 13, when the spindle 30 and support surfaces 90 are both moved to their extremes (here, at the X and Y switches 120, 140), the spindle 30 (and, more particularly, the tool 20 held by the spindle 30) will be positioned over the sensor 100 of the clamp 60. It should be noted that while both the spindle 30 and the support surface 85 were moved to position the spindle 30 over the sensor 100 of the clamp 60, in other embodiments, just the spindle 30 or just the support surface 85 are moved, or moved differently. Also, any suitable technology can be used for the X, Y, and Z switches 120, 140, 145 (e.g., touch, optical, or proximity sensors). Also, while the X, Y, and Z switches 120, 140, 145 can use the same technology, one or more of the switches can use different technology from the rest.

Figure 14:
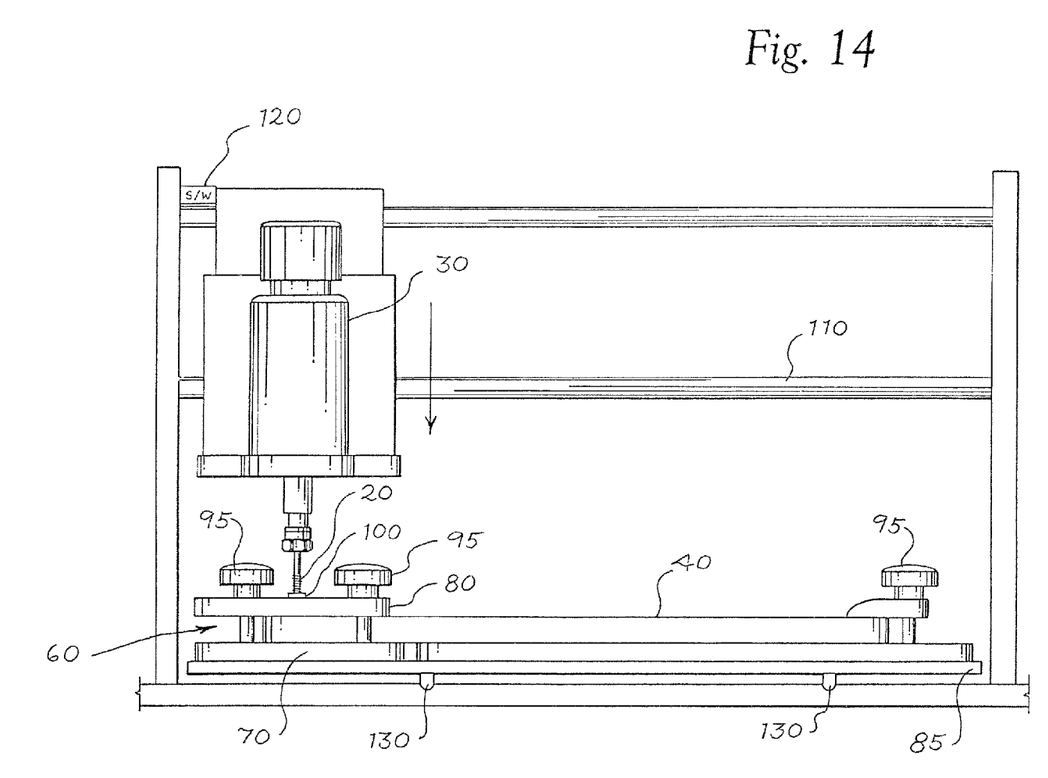
FIG. 14 is an illustration of a CNC milling machine of an embodiment with a tool of a spindle contacting a sensor.

The controller 1500 then lowers the spindle 30 in the Z direction until the tool 20 held by the spindle 30 contacts the sensor 100 (see FIG. 14) (act 640). As noted above, the sensor 100 can take any suitable form, so "contacting the sensor 100" can mean different things depending on the type of sensor that is used. For example, if the sensor 100 is a pressable button, "contacting the sensor 100" can mean that the tool 20 (which can be conductive or non-conductive) presses the button. As another example, if the sensor 100 is an electrical conductive element, a "contacting the sensor 100" can mean that the tool 20 (which can be conductive) makes electrical contact with the electrically-conductive element. As yet another example, if the sensor 100 is a light sensor, "contacting the sensor 100" can mean that the tool 20 passed through the light boundary established by the sensor 100. Of course, these are just examples, and other configurations can be used.

When the tool 20 held by the spindle 30 contacts the sensor 100, the sensor 100 sends a signal to the controller 100 (act 650). In response to this signal, the controller 100 stops movement of the spindle 30 (act 660) and determines how far down the spindle 30 went in the Z direction before the sensor 100 was contacted by the tool 20 (act 670). The controller 1500 knows the thickness of the second clamp portion 80 and the thickness (if any) of the portion of the sensor 100 that protrudes above the top surface of the second clamp portion 80. So, the controller 1500 can calculate the Z location of the top surface of the work piece 40 (act 680) using the following equation: (Starting Z position of spindle)−(Ending Z position of spindle)−(Thickness of the second clamp portion)−(Thickness of the sensor 100). (So, in this embodiment, the calculation is independent of the thickness of the work piece and the length of the tool 20). This calculated Z location is then set as the Z origin of the work piece 40. With the milling machine 10 now aware of the X, Y, and Z origins of the work piece 40, the milling machine 10 can begin carving the design into the work piece 40 (act 690). Accordingly, by using the "smart clamp" 60 with auto Z-zero in this embodiment, the milling machine 10 performs automatic calibration, so the user just needs to click "carve" to start and does not need to perform manual measurements and coordinate entry.

Figure 16:
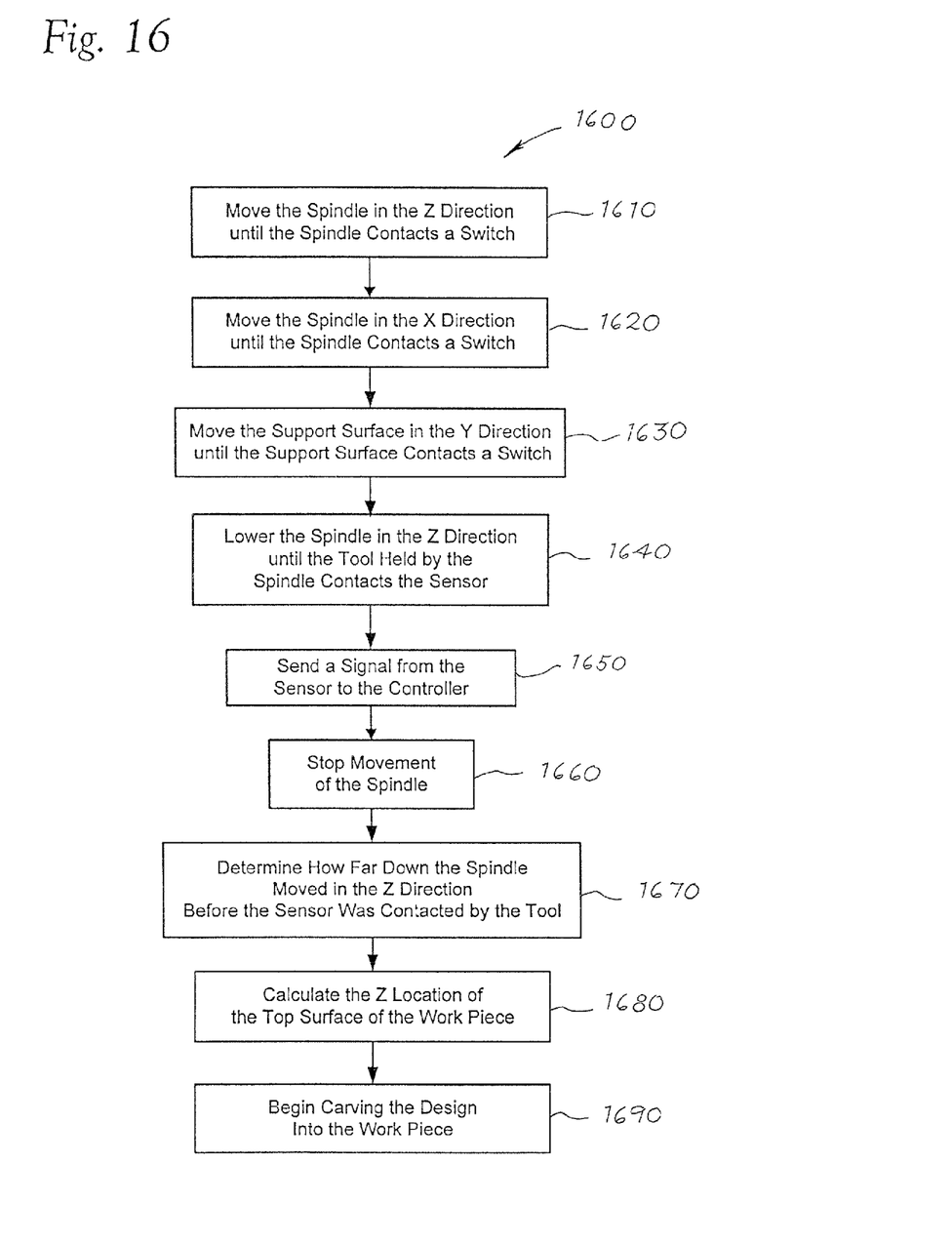
FIG. 16 is a flowchart of a method of an embodiment for automatically determining the Z origin of a CNC milling machine.

As discussed above, the controller 1500 in the milling machine 10 performed various functions, and the flow chart 1600 in FIG. 16 is an example of an algorithm that the controller 1500 can execute to automatically determine the Z origin of the work piece 40. Of course, the controller 1500 can perform other functions and control other aspects of the milling machine 10, such as the actual carving operation. The controller 1500 can be implemented in any suitable manner. For example, the controller 1500 can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 1500 can be configured with hardware and/or firmware to perform the various functions described below and shown in the flow diagrams. Also, some of the components shown as being external to the controller 1500 can also be stored internal to the controller 1500. Further, other components (e.g., random access memory (RAM), read only memory (ROM), a central processing unit (CPU) (or "processor"), etc.) can be used. In one embodiment the controller 1500 is a motion controller called Carvin designed by Inventables.

More generally, the controller 1500 can contain "circuitry" configured to perform various operations. As used herein, the term "circuitry" can refer to an instruction processor, such as a Central Processing Unit (CPU), microcontroller, or a microprocessor; or an Application Specific Integrated Circuit (ASIC), Programmable Logic Device (PLD), or Field Programmable Gate Array (FPGA); or a collection of discrete logic or other circuit components, including analog circuit components, digital circuit components or both; or any combination thereof. Circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, "circuitry" may store or access instructions for execution or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs and part of a library, such as a shared library like a Dynamic Link Library (DLL). The library, for example, may contain shared data and one or more shared programs that include instructions that perform any of the processing described above or illustrated in the drawings, when executed by the circuitry. Accordingly, "circuitry" may be implemented in many different ways and in many different combinations of hardware and software.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A milling machine comprising:
a clamp comprising a first clamp portion positioned in a predetermined X and Y location in the milling machine and a second clamp portion movable with respect to the first clamp portion to secure a work piece in the predetermined X and Y location, wherein the second clamp portion comprises a sensor;
a spindle movable in a Z direction; and
a controller in communication with the spindle and the sensor, wherein the controller is configured to automatically determine a position of a top of the work piece by having the spindle be positioned over the sensor and then moving the spindle in the Z direction until the controller receives a signal from the sensor indicating that a tool held by the spindle contacted the sensor.

2. The milling machine of claim 1, wherein the controller is configured to automatically determine the position of the top of the work piece by subtracting, from a starting position of the spindle, a distance the spindle moved in the Z direction, a thickness of a portion, if any, of the sensor that protrudes from the second clamp portion, and a thickness of the second clamp portion.

3. The milling machine of claim 1, wherein the clamp is L-shaped.

4. The milling machine of claim 1, wherein one of the first and second clamp portions comprises a protrusion to register the work piece, and wherein the other of the first and second clamp portions comprises a recess to accept the protrusion.

5. The milling machine of claim 1, wherein the sensor is a movable button.

6. The milling machine of claim 1, wherein the tool is non-conductive.

7. The milling machine of claim 1, wherein the milling machine comprises a computer numerical control (CNC) milling machine.

8. A method for determining a Z-origin of a work piece, the method comprising:
performing the following in a milling machine:
positioning a spindle over a sensor on a clamp securing a work piece in a predetermined X and Y location; and
determining a Z-origin of the work piece by moving the spindle in a Z direction until a tool held by the spindle contacts the sensor.

9. The method of claim 8, wherein determining the Z-origin of the work piece comprises:
calculating a distance that the spindle moved in the Z direction until the tool held by the spindle contacted the sensor; and
adding to the calculated distance a thickness of a top portion of the clamp positioned between the tool and a top surface of the work piece and a distance, if any that a part of the sensor protrudes from a top surface of a top portion of the clamp.

10. The method of claim 8 further comprising moving one or both of the spindle and the support surface to position the spindle over the sensor.

11. The method of claim 8, wherein the clamp is L-shaped.

12. The method of claim 8, wherein one of the first and second clamp portions comprises a protrusion to register the work piece, and wherein the other of the first and second clamp portions comprises a recess to accept the protrusion.

13. The method of claim 8, wherein the sensor is a movable button.

14. The method of claim 8, wherein the tool is non-conductive.

15. A clamp for automatically determining a Z-origin of a work piece in a milling machine, the clamp comprising:
a first clamp portion; and
a second clamp portion movable with respect to the first clamp portion, wherein the second clamp portion comprises a Z-origin sensor.

16. The clamp of claim 15, wherein the clamp is L-shaped.

17. The clamp of claim 15, wherein one of the first and second clamp portions comprises a protrusion to register the work piece, and wherein the other of the first and second clamp portions comprises a recess to accept the protrusion.

18. The clamp of claim 15, wherein the sensor is a movable button.

19. The clamp of claim 15, wherein the sensor is non-conductive.

20. The clamp of claim 15, wherein the milling machine is a computer numerical control (CNC) milling machine.

* * * * *